(12) United States Patent
Decker et al.

(10) Patent No.: US 7,331,998 B2
(45) Date of Patent: Feb. 19, 2008

(54) LIQUID FORMULATIONS OF DIRECT DYES

(75) Inventors: Juergen Decker, Trier (DE); Gero Nordmann, Mundenheim (DE); Ingo Klopp, Weisenheim (DE); Gunter-Rudolf Schroeder, Mannheim (DE); Helmut Reichelt, Neustadt (DE); Christoph Bomba, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 6 days.

(21) Appl. No.: 10/994,287

(22) Filed: Nov. 23, 2004

(65) Prior Publication Data

US 2005/0132510 A1 Jun. 23, 2005

(30) Foreign Application Priority Data

Dec. 22, 2003 (EP) .................... 03029578

(51) Int. Cl.
*C09B 67/44* (2006.01)
*C09B 67/00* (2006.01)
*C09B 67/36* (2006.01)

(52) U.S. Cl. .............. 8/638; 8/641; 8/662; 8/478; 162/162

(58) Field of Classification Search .............. 8/478, 8/638, 662, 641; 162/162
See application file for complete search history.

(56) References Cited

U.S. PATENT DOCUMENTS

| 3,679,353 A | 7/1972 | Streck |
| 4,310,331 A | 1/1982 | Arsac et al. |
| 4,560,745 A | 12/1985 | Weberndoerfer et al. |
| 5,041,539 A | 8/1991 | Tzikas et al. |
| 6,160,169 A * | 12/2000 | Bermes et al. ............... 562/58 |

FOREIGN PATENT DOCUMENTS

| CH | 642 100 A5 | 3/1984 |
| DE | 28 20 487 A1 | 11/1979 |
| DE | 30 46 450 A1 | 8/1981 |
| EP | 0 122 224 A2 | 10/1984 |
| EP | 0 270 003 A2 | 6/1988 |
| EP | 1 258 562 A2 | 11/2002 |
| GB | 1 480 712 | 7/1977 |
| GB | 2 164 348 A | 3/1986 |
| JP | 52-57234 | 5/1977 |

OTHER PUBLICATIONS

Colour Index, third Edition, Society of dyers and Colourists, vol. 4, p. 4365-4366, 1971.*

* cited by examiner

*Primary Examiner*—Lorna M. Douyon
*Assistant Examiner*—Tri Nguyen
(74) *Attorney, Agent, or Firm*—Oblon, Spivak, McClelland, Maier & Neustadt, P.C.

(57) ABSTRACT

The present invention relates to aqueous liquid formulations comprising
  5-25% by weight of a dye composition comprising
    70-95% by weight of a dye obtainable by reduction or thermal treatment of Direct Yellow 11
    1-30% by weight of a blue direct dye and
    0-20% by weight of a red direct dye
    (all based on the dye composition)
  1-15% by weight of a saturated, cyclic or acyclic water-soluble amine comprising a primary, secondary or tertiary amino group and at least one further functional group selected from primary, secondary and tertiary amino groups, OH groups and ether groups, and
  1-30% by weight of urea
based on the total weight of the aqueous liquid formulation, wherein the total amount of water-soluble amine and urea does not exceed 40% by weight, and also their use for dyeing cellulose material especially paper.

13 Claims, No Drawings

LIQUID FORMULATIONS OF DIRECT DYES

The present invention relates to aqueous liquid formulations comprising
5-25% by weight of a dye composition comprising
  70-95% by weight of a dye obtainable by reduction or thermal treatment of Direct Yellow 11
  5-30% by weight of a blue direct dye and
  0-20% by weight of a red direct dye
  (all based on the dye composition)

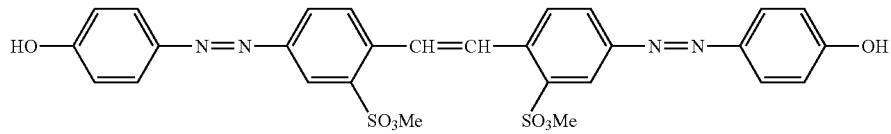

1-15% by weight of a saturated, cyclic or acyclic water-soluble amine comprising a primary, secondary or tertiary amino group and at least one further functional group selected from primary, secondary and tertiary amino groups, OH groups and ether groups, and
1-25% by weight of urea
based on the total weight of the aqueous liquid formulation, wherein the total amount of water-soluble amine and urea does not exceed 40% by weight, and also their use for dyeing cellulose material especially paper.

The manufacture of packaging material requires brown dyes having a light brown hue which only varies within narrow limits. The brown dye can be a synthesized mixture of dyes, as in the case of Basic Brown 1, or a blended mixture of a yellow dye and a blue dye with or without a red dye. Blended dye mixtures have the great advantage that it is easier to shade the hue. It is more difficult, however, to obtain storage-stable liquid formulations of these blended dye mixtures.

Poor stability of a liquid formulation in storage results from the often limited solubility of dyes in water, since limited solubility in water is usually a direct consequence of the desired high affinity for fiber. While this has no repercussion in the papermaking machine (because the dye concentration is low), it can have immense consequences for the commercially ever more popular liquid formulations. The poor storage stability of the liquid formulation often gives rise to problems when the drums have to be stored for a prolonged period. During this period, both low and high temperatures can lead to precipitates which can be critical for metering pumps but can also lead to specks or nonuniform colorations on paper. Storage stability is even more problematical in the case of a blended dye mixture, since in this case more than one dye has to be kept in solution at one and the same time.

Dye formulation solubility is generally improved by addition of solubility improvers which often also serve as a counter-ion to the dye acids. Known solubility improvers come from a wide range of chemical classes such as alcohols, mono-, oligo- or polyalkylene glycols, lactams, amines and amides.

EP 1 258 562 describes brown mixtures blended with Direct Yellow 11 and also with Direct Orange 15, but they do not contain any solubility-improving additives whatsoever.

GB-A-2 164 348 teaches storage-stable liquid formulations of Direct Yellow 11 through its reaction with di- and triethanolamine.

DE-A-30 46 450 reveals the preparation of Direct Yellow 11 from 4-nitrotoluene-2-sulfonic acid in the presence of ethanolamine and lithium hydroxide. This is followed by the addition of urea.

CH-A-642 100 teaches the stabilization of the liquid formulation of the dye in formula by means of potassium hydroxide or alkanolamine.

JP 52057234 teaches the stabilization of liquid formulations of stilbeneazo dyes such as Direct Yellow 11 with urea or alkyl-substituted ureas.

It would be desirable, then, to be able to offer ready-blended brown mixtures to paper manufacturers specific to their respective raw pulps for the manufacture of packaging material. This would be beneficial to each paper manufacturer because they would no longer have to self-mix and would only have to store one brown dye mixture in future. So the storage stability of brown aqueous liquid formulations is the central concern of the present invention. Since the brown liquid formulation is produced from a yellow/orange liquid formulation, which is shaded with red and blue, the yellow/orange liquid formulation must likewise have a high stability in storage. In addition, the assistants added to the yellow/orange liquid formulation must also have a stabilizing effect in the brown liquid formulation, since it would be impracticable to remove them again.

The present invention thus has for its object a liquid formulation which possesses improved stability in storage both at low and at high temperatures not only for the yellow/orange dye but also for the brown composition of dyes.

We have found that this object is achieved by the above-mentioned liquid formulations.

Preferably, the total amount of water-soluble amine and urea does not exceed 30% by weight.

The weight % ages reported for dyes are each based on the dye reckoned in the form of its free acid. The dyes are present in the liquid formulation in the form of their salts. The dyes obtained by reaction of Direct Yellow 11 preferably have alkali metal ions such as sodium, potassium and especially lithium ions as counter-ions.

Direct Yellow 11 and Direct Orange 15 are stilbene dyes. Direct Yellow 11 is obtained as a product of the self-condensation of 5-nitro-o-toluenesulfonic acid in an aqueous alkaline medium. Its reaction with reducing agents such as glucose or sodium sulfide leads to Direct Orange 15 (C.I. 40002/40003). These dyes are mixtures of dyes of uncertain constitution. Direct Orange 15 is a mixture whose CIELAB hue angle on bleached cellulose varies in the range from 45 to <55 in the color space. Reducing Direct Yellow 11 substoichiometrically with regard to the nitrotoluenesulfonic acid gives dye mixtures having a yellowish orange hue. This bathochromic shift in the hue is also referred to as the "reddening" of Direct Yellow 11. Such reddening can also be achieved through thermal treatment of Direct Yellow 11.

Preference is given to yellowish orange dyes (hereinafter also referred to as partially reddened dyes) which are obtainable by reduction or thermal treatment of Direct Yellow 11 and whose hue angle on bleached cellulose is in the range from 55 to 75 and especially in the range from 55 to 65 in the color space.

The red or blue direct dye is an anionic direct dye. Blue refers to an absorption maximum in the wavelength range from 560 to 650 nm. Red refers to an absorption maximum in the wavelength range from 490 to 540.

Preference is given to blue direct dyes such as Direct Blue 71, 199, 218, 267, 273, 273 as a copper complex, 279, 281 and 290. Particular preference is given to Direct Blue 15, 279, 281, 290 and the dyes of the formulae I, II and III.

Preference is likewise given to red direct dyes such as Direct Red 80, 81, 239, 253, 254 and 262.

Additional shading is possible with an orange dye, depending on the brown hue desired. However, this will generally not be done, since partially reddened dyes with or without the red direct dye make it possible to achieve all hues.

Preference is given to aqueous liquid formulations whose dye composition comprises 70-95% by weight of a dye obtainable by reduction or thermal treatment of Direct Yellow 11
5-30% by weight of a blue direct dye and
0-20% by weight of a red direct dye.

Particular preference is given to aqueous liquid formulations whose dye composition comprises
70-95% by weight of partially reddened Direct Yellow 11,
5-20% by weight of a blue direct dye and

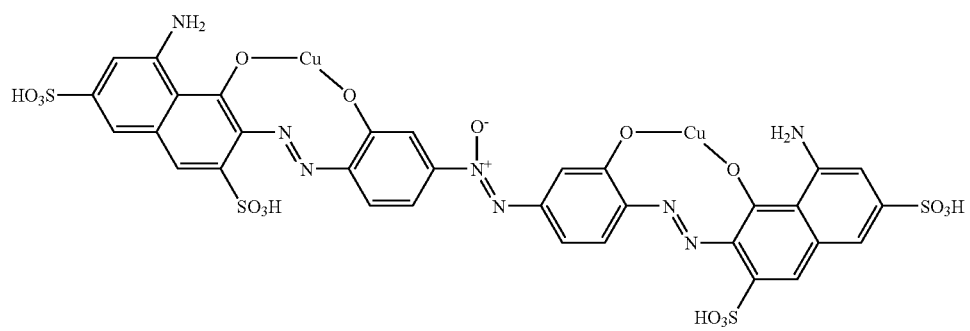

(I)

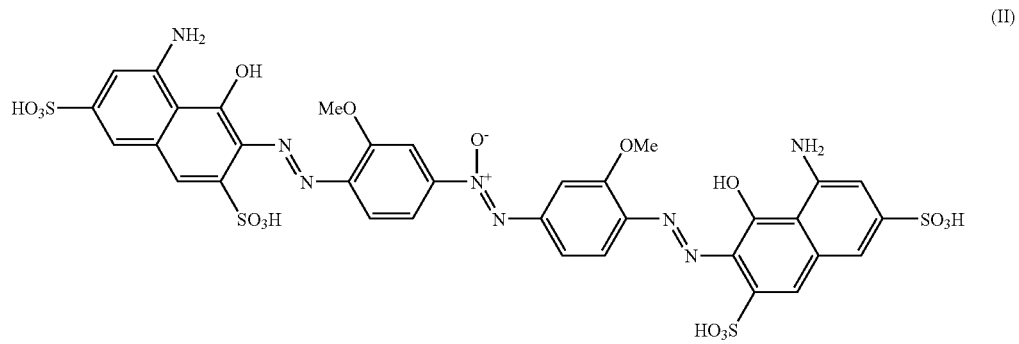

(II)

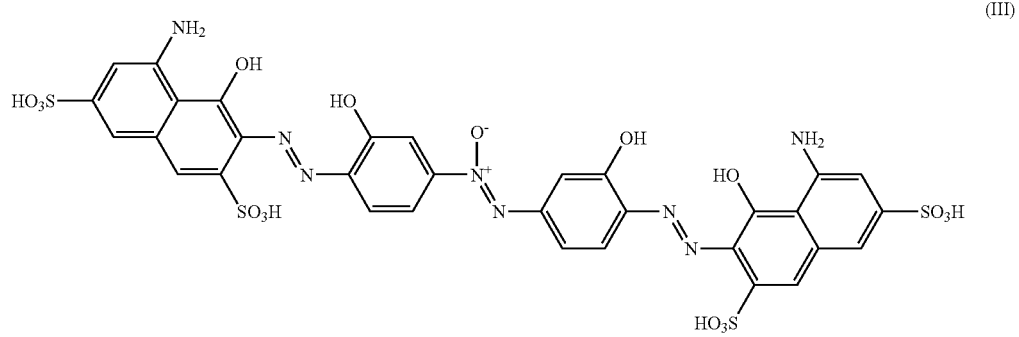

(III)

0-15% by weight preferably 0-12% by weight, of a red direct dye.

Very particular preference is given to aqueous liquid formulations whose dye composition comprises 70-95% by weight of a dye obtainable by reduction or thermal treatment of Direct Yellow 11, preferably partially reddened Direct Yellow 11

5-15% by weight of a dye selected from Direct Blue 15, 273, 279, 281, 290 and the dyes of the formula I, II and III and 0-15% by weight preferably 0-12% by weight of a dye selected from Direct Red 81, 239 and 254.

A reddening of Direct Yellow 11 is obtained for example by reacting it with formaldehyde or by basic condensation of 5-nitrotoluenesulfonic acid in the presence of formaldehyde. Reddening is further achieved by adding glucose or sodium sulfide. Further reddening reactions are to be found in the Colour Index and its literature references to the dyes C.I. 40001, 40002, 40003.

Preference is given to dyes which are obtained by reaction of Direct Yellow 11 with an organic reducing agent. Examples of organic reducing agents are hydroxy aldehydes such as pentoses, hexoses and heptoses, preferably glucose.

The preferred partially reddened dyes are obtainable by substoichiometric reduction based on nitrotoluenesulfonic acid.

Particularly preferred partially reddened dyes are obtained by reaction of Direct Yellow 11 with 0.05 to 0.3 mol and preferably 0.1 to 0.25 mol of hydroxy aldehyde, especially glucose, per mole of nitrotoluenesulfonic acid used. When the desired hue is attained, the reddening reaction may be stopped by neutralizing and cooling.

The synthesis of Direct Yellow 11 is common knowledge. Direct Yellow 11 is obtained by heating an alkaline aqueous solution of nitrotoluenesulfonic acid. The reaction of nitrotoluenesulfonic acid with an alkali metal hydroxide such as sodium hydroxide or preferably lithium hydroxide first produces the salt of nitrotoluenesulfonic acid, and it condenses on heating to 40-80° C. in the basic medium to form the azo stilbene dye.

Prior to the condensation reaction, the mixture is preferably admixed with a water-soluble amine (A), preferably an alkanolamine (A), in an amount of 0.1 to 0.5 mol of alkanolamine (A) per mole of nitrotoluenesulfonic acid. Alkanolamines (A) are for example ethanolamine, isopropanolamine or preferably diethanolamine. It is believed that such an addition has a solubilizing effect on reaction intermediates.

After condensation and cooling, the alkaline mixture is substantially neutralized, for example with acetic acid. Neutralizing as used herein refers to a pH in the range from 7 to 9.

In a preferred version, the fully or partially reddened dye is prepared using a Direct Yellow 11 which is obtainable by reacting 1 mol of nitrotoluenesulfonic acid with 1.4 to 1.8 mol of lithium hydroxide, addition of 0.1 to 0.5 mol of alkanolamine, heating the reaction mixture to 40-80° C. and neutralizing.

In a particularly preferred version, the synthesis of Direct Yellow 11 and the reddening step are carried out without intervening isolation of Direct Yellow 11. The partially reddened dye is then obtainable directly by reaction of 1 mol of nitrotoluenesulfonic acid with 1.4 to 1.8 mol of lithium hydroxide, addition of 0.1 to 0.5 mol of alkanolamine, heating the reaction mixture to 40-80° C., reacting with 0.05 to 0.3 mol of glucose based on one mole of nitrotoluenesulfonic acid used and neutralization.

Particular preference is given to a procedure where the temperature is raised continuously, in a linear or nonlinear manner, or periodically during coupling and reduction. The temperature difference between the start of the coupling reaction and the end of the reduction reaction may be up to 40K. Generally, this difference is in the range from 15 to 25K.

The aqueous liquid formulation of the present invention contains at least one above-defined water-soluble amine in an amount of 1-15% by weight based on the total weight of the liquid formulation. Water-soluble amine refers to compounds which have a solubility of >100 g/l of water at 25° C. The water-soluble amines used according to the present invention are preferably selected from the group comprising ethanolamine, ethylenediamine, N,N-dimethylethylenediamine, dimethylethanolamine, N-methyldiethanolamine, monomethylethanolamine, 2-(2-aminoethoxy)ethanol, aminoethylethanolamine, morpholine, N-methylmorpholine, N-ethylmorpholine, dimethylaminopropylamine, methoxypropylamine, N-aminopropylmorpholine, N,N-dimethylcyclohexylamine, pentamethyldiethylenetriamine, tetramethylbis(amino-ethyl) ether, tetramethyldipropylenetriamine, pentamethyldipropylenetriamine, benzyldimethylamine, diethylenetriamine, triethylenetetramine and tetraethylenepentamine.

The water-soluble amine more preferably comprises ethanolamine with or without one or more amines (A) other than ethanolamine, especially an alkanolamine and specifically diethanolamine. In a first embodiment, the water-soluble amine comprises at least >90% by weight, based on the total amount of water-soluble amine, of ethanolamine. In another preferred embodiment, the water-soluble amine comprises 60% to 90% by weight of alkanolamine and 10% to 40% by weight of a water-soluble amine (A) other than ethanolamine.

Preference is given to aqueous liquid formulations comprising 10-25% by weight of dye composition, 2-10% by weight of the water-soluble amine and 1-25% and preferably 1-10% by weight of urea based on the total weight of the aqueous formulation, wherein the total amount of water-soluble amine and urea does not exceed 40% by weight preferably 30% by weight. Particular preference is given to aqueous liquid formulations comprising 15-20% by weight of dye composition specifically the preferred dye compositions, 5-8% by weight of the water-soluble amine and 4-15% and preferably 4-6% by weight of urea.

As mentioned above, a portion of the water-soluble amine included in the liquid formulation can be added in the course of the synthesis of Direct Yellow 11. In this case, the water-soluble amine is preferably an amine (A) other than ethanolamine, especially an alkanolamine and specifically diethanolamine. Preference is therefore given to liquid formulations comprising 5-25% by weight of dye composition, 1-10% by weight, preferably 4-7% by weight and especially 4-6% by weight of a first water-soluble amine specifically ethanolamine, 0.5-5% by weight and preferably 1.5-3% by weight of an amine (A) other than said first water-soluble amine and 1-25% by weight, preferably 4-15% by weight and especially 4-6% by weight of urea.

The dyes may be used as a moist presscake or else in dried form. In this case, a solution is prepared by admixing the water-soluble amine with preferably ethanolamine and urea. The reaction mixture is preferably used directly for the reddening reaction of Direct Yellow 11 without additional isolating steps. Preferably, urea is added first to the resulting reaction mixture from the reddening reaction of Direct Yellow 11. Then the water-soluble amine is added with or without the other dyes. The water-soluble amine can be added during dye synthesis or at a later date. Care must merely be taken to ensure that the total amount of 15% by weight of water-soluble amine in the liquid formulation is not exceeded.

Further additives in the liquid formulation can be in principle $C_1$-$C_4$-alkanols, for example methanol, ethanol, propanol, isopropanol, butanol, isobutanol, sec-butanol or tert-butanol, carboxamides, such as N,N-dimethylformamide or N,N-dimethylacetamide, ketones or keto alcohols, such as acetone, methyl ethyl ketone or 2-methyl-2-hydroxypentan4-one, mono-, oligo- or polyalkylene glycols or thioglycols which have $C_2$-$C_6$-alkylene units, such as ethylene glycol, 1,2- or 1,3-propylene glycol, 1,2- or 1,4-butylene glycol, hexane-1,6-diol, diethylene glycol, triethylene glycol, dipropylene glycol, thiodiglycol, polyethylene glycol or polypropylene glycol, other polyols, such as glycerol or hexane-1,2,6-triol, $C_1$-$C_4$-alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyldiglycol) or triethylene glycol monomethyl ether or triethylene glycol monoethyl ether, $C_1$-$C_4$-alkyl esters of polyhydric alcohols, γ-butyrolactone or dimethyl sulfoxide. Suitable solubilizing additives are further lactams, such as ε-caprolactam, pyrrolidin-2-one or N-methylpyrrolidin-2-one, cyclic ureas, such as 1,3-dimethylimidazolidin-2-one or 1,3-dimethylhexahydropyrimid-2-one, and also polyacrylic acids, polyacrylic acid derivatives, polyvinyl acetates, polyvinyl alcohols, polyvinylpyrrolidones, polysiloxanes or copolymers of the respective monomers. It is further possible to use oligomers of ethylene oxide or propylene oxide or derivatives of these oligomers.

These additives can be added to the liquid formulation, but do not provide any significant effect. Their fraction would therefore in general not exceed 10% by weight, based on the total weight of the liquid formulation, and is frequently not more than 5% by weight. More particularly, the liquid formulations of the present invention contain such additives at <1% by weight, if at all. Particular preference is therefore given to aqueous liquid formulations consisting of
15-20% by weight of the dye composition,
1-10% by weight of ethanolamine,
1-10% by weight of urea, and
0.5-5% by weight of a water-soluble amine other than ethanolamine, especially an alkanolamine, specifically diethanolamine.

The solutions obtained have excellent stability in storage. They provide good paper coloration especially in the pulp.

The examples which follow illustrate the invention.

a) Preparation Of Reddened Direct Yellow 11

To 1.54 l of water were added 1.10 kg of p-nitrotoluenesulfonic acid (83% by weight pure, 4.21 mol). A total of 300 g of solid lithium hydroxide (56% pure, 7 mol) were added a little at a time. Then 110 g of diethanolamine were added and the mixture was stirred at 55° C. for 15 h. One liter of water was added. The mixture was stirred for 10 min, 125 g of glucose monohydrate were added and the temperature was raised to 65° C. for 2 h. Then a pH of 9.0 was set with 18 g of glacial acetic acid. The product was obtained as brownish red gellike substance. It was obtained in an amount of 4.19 kg and had a dye content of 26.2%.

b) Test For Stability In Storage

Sealed samples were stored concurrently at 4° C. and 50° C. for 8 weeks and subsequently visually assessed according to the following key: 1=clear; 2=slight film; 3=cloudy; 4=some precipitate; 5=substantial precipitate c) Preparation Of Liquid Formulation

EXAMPLE 1

53 g of the reddened Direct Yellow 11 obtained according to a), 8.3 9 of urea, 5.2 g of ethanolamine, 0.55 g of Direct Red 239 in the form of a concentrated aqueous solution of the mixed sodium/ethanolammonium salt, 3.0 g of Direct Blue 279 in the form of a concentrated aqueous solution of the triethanolammonium salt and also 42.7 g of water were added together and intensively stirred for 10 min. The sample was then filled into a 100 ml screw top glass and stored like that at the appropriate temperature for 8 weeks. This sample was given a rating of 2 after 8 weeks at 4° C. and of 1 after 8 weeks at 50° C.

EXAMPLE 2

53 g of the reddened Direct Yellow 11 obtained according to a), 8.3 g of urea, 5.2 g of ethanolamine, and also 42.7 g of water were added together and intensively stirred for 10 min. The sample was then filled into a 100 ml screw top glass and stored like that at the appropriate temperature for 8 weeks. This sample was given a rating of 1 after 8 weeks at 4° C. and of 1 after 8 weeks at 50° C.

Liquid formulations were prepared similarly to Example 1 using the blend components recited there and replacing ethanolamine by the additives reported in Table 1. Examples 4-9 are noninventive, comparative tests.

TABLE 1

| Ex. | Additive | Storage result after 8 weeks 4° C. | 50° C. |
|---|---|---|---|
| 3 | Diethylenetriamine | 2 | 1 |
| 4 | Propylene glycol | 2 | 5 |
| 5 | Butylglycol | 2 | 5 |
| 6 | Neopentylglycol | 2 | 5 |
| 7 | Phenylglycol | 3 | 5 |
| 8 | N-Methylpyrrolidone | 2 | 5 |
| 9 | Propylene carbonate | 2 | 5 |

Liquid formulations were prepared similarly to Example 1 using the compositions reported in Table 2. Table 3 shows the selected dye compositions. The yellow dye used was the reddened Direct Yellow 11 prepared according to a) (dye content 26.2% by weight).

TABLE 2

| Ex. | Dye total [g] | | Urea [g] | | Ethanolamine[g] | $H_2O$ [g] | Stability 4° C. | 50° C. |
|---|---|---|---|---|---|---|---|---|
| 10 | 11.4 | 14% | 3.3 | 4% | 4.1 | 5% | 31.4 | 1 | 1-2 |
| 11 | 13.7 | 17% | 3.3 | 4% | 4.1 | 5% | 31.4 | 1-2 | 1-2 |
| 12 | 13.8 | 16% | 3.5 | 4% | 4.3 | 5% | 33 | 1-2 | 1-2 |
| 13 | 11.5 | 14% | 20 | 24% | 4.2 | 5% | 15 | 1 | 1-2 |
| 14 | 13.8 | 17% | 20 | 24% | 4.2 | 5% | 15 | 1-2 | 1 |
| 15 | 13.9 | 16% | 20 | 24% | 4.4 | 5% | 15.8 | 1-2 | 1-2 |

TABLE 3

| Ex. | Yellow* | | Red** | | Blue*** | |
|---|---|---|---|---|---|---|
| 10 | 11.3 g | 100% — | — | 0% — | | 0% |
| 11 | 11.3 g | 83% D.R. 239 | 0.72 g | 5% D.B. 279 | 1.6 g | 12% |
| 12 | 12.0 g | 87% D.R. 81 | 0.48 g | 3% D.B. 279 | 1.33 g | 10% |
| 13 | 11.5 g | 100% — | | 0% — | | 0% |
| 14 | 11.5 g | 83% D.R. 239 | 0.72 g | 5% D.B. 279 | 1.6 g | 12% |
| 15 | 12.1 g | 87% D.R. 81 | 0.48 g | 3% D.B. 279 | 1.33 g | 10% |

*converted to dye fraction
**the amount of dye acid is reported. D.R. 239 is added as a concentrated aqueous solution of the mixed sodium/ethanolammonium salt, D.R. 81 as a concentrated aqueous solution of the triethanolammonium salt.
***the amount of dye acid is reported. D.B. 279 is added as a concentrated aqueous solution of the triethanolammonium salt.

We claim:

1. An aqueous liquid formulation comprising
   5-25% by weight of a dye composition comprising
      70-95% by weight of a dye obtainable by substoichiometric reduction based on 5-nitro-o-toluenesulfonic acid of Direct Yellow 11 with 0.05 to 0.3 moles of an organic reducing agent
      1-30% by weight of a blue direct dye and
      0-20% by weight of a red direct dye
      (all based on the dye composition)
   1-15% by weight of a saturated, cyclic or acyclic water-soluble amine comprising a primary, secondary or tertiary amino group and at least one further functional group selected from primary, secondary and tertiary amino groups, OH groups and ether groups, and
   1-30% by weight of urea
based on the total weight of the aqueous liquid formulation, wherein the total amount of water-soluble amine and urea does not exceed 40% by weight.

2. The aqueous liquid formulation according to claim 1 whose dye composition comprises lithium salts of the dye obtainable by reduction of Direct Yellow 11.

3. The aqueous liquid formulation according to any one of claims 1 to 2 wherein said organic reducing agent is hydroxyaldehyde.

4. The aqueous liquid formulation according to any one of claims 1 to 2 whose Direct Yellow 11 is obtainable by reacting one mole of nitrotoluenesulfonic acid with 1.4 to 1.8 mol of lithium hydroxide, adding 0.1 to 0.5 mol of an alkanolamine, heating the reaction mixture to 40-80° C. and subsequent neutralizing.

5. The aqueous liquid formulation according to any one of claims 1 to 2 comprising
   10-25% by weight of dye composition
   2-10% by weight of water-soluble amine and
   1-25% by weight of urea.

6. The aqueous liquid formulation according to any one of claims 1 to 2 comprising
   5-25% by weight of dye composition
   1-10% by weight of water-soluble amine
   0.5-5% by weight of a different water-soluble amine (A) and
   1-25% by weight of urea.

7. The aqueous liquid formulation according to any one of claims 1 to 2 comprising
   5-25% by weight of dye composition
   1-10% by weight of ethanolamine
   0.5-5% by weight of an alkanolamine other than ethanolamine and
   1-25% by weight of urea.

8. The aqueous liquid formulation of claim 1, wherein said aqueous liquid formulation has a hue angle on bleached cellulose of from 55 to 65.

9. The aqueous liquid formulation of claim 1, wherein said blue direct dye has an absorption maximum in the wavelength range from 560 to 650 nm.

10. The aqueous liquid formulation of claim 1, wherein a red direct dye is present and wherein said red direct dye has an absorption maximum in the wavelength range from 490 to 540 nm.

11. The aqueous liquid formulation of claim 1, wherein said organic reducing agent is at least one selected from the group consisting of a pentose, a hexose, a heptose and glucose.

12. The aqueous liquid formulation of claim 1, wherein said organic reducing agent is glucose.

13. A method of dyeing paper and board comprising dyeing paper andlor board with the aqueous liquid formulation according to any one of claims 1-2.

* * * * *